Patented Oct. 13, 1931

1,827,169

UNITED STATES PATENT OFFICE

WALTER M. RUSSELL, OF WELLESLEY, MASSACHUSETTS, ASSIGNOR TO THE GAS MACHINERY COMPANY, OF CLEVELAND, OHIO, A CORPORATION OF OHIO

PROCESS OF MANUFACTURING WATER GAS

Application filed April 18, 1925. Serial No. 24,126.

My invention relates to processes of manufacturing water gas, and especially to that class of processes which is designed to make what are known as "back-runs". In practicing the processes in which such "back-runs" are made, steam is passed through the gas-generator and the resultant gases taken off therefrom and conducted to the seal or holder without such gases passing through the combustion chamber, or through the carburetor and superheater.

The object of the invention is to increase the efficiency of such back-run sets and is accomplished by extending the superheater beyond the gas outlet and providing such extension with a water inlet and also providing such extension with passages formed by heat-absorbing material such as checker-work, arranged so as to be transversible by the water, steam and blast gases. As a result of this arrangement, the heat of the blast gases may be economically utilized for producing the steam required for the back-runs at substantially the superheater or combustion chamber pressure, and said steam may be utilized for controlling the temperature of the superheater or combustion chamber, as will be hereinafter described.

Such arrangement of parts, in addition to conserving the heat of the blast-gases, produced in a carburetted water-gas set or blue water-gas set, for steam production, also permits superheated steam to be made which may be introduced at the top of the superheater, for the purposes of a back-run, and hence arrests to a maximum degree the cooling off of such superheater and also promotes the production of gas during such back-run.

The said invention consists of certain series of steps hereinafter fully described and particularly set forth in the claims.

My improved process is described and shown in this application in combination with improved apparatus in which the process may be carried out, but the claims of this application are limited to the process feature thereof.

The annexed drawings and the following description set forth in detail certain steps embodying my improved process, the disclosed steps, however, constituting but a few of the various series of steps by which my improved process may be carried out.

Figure 1:
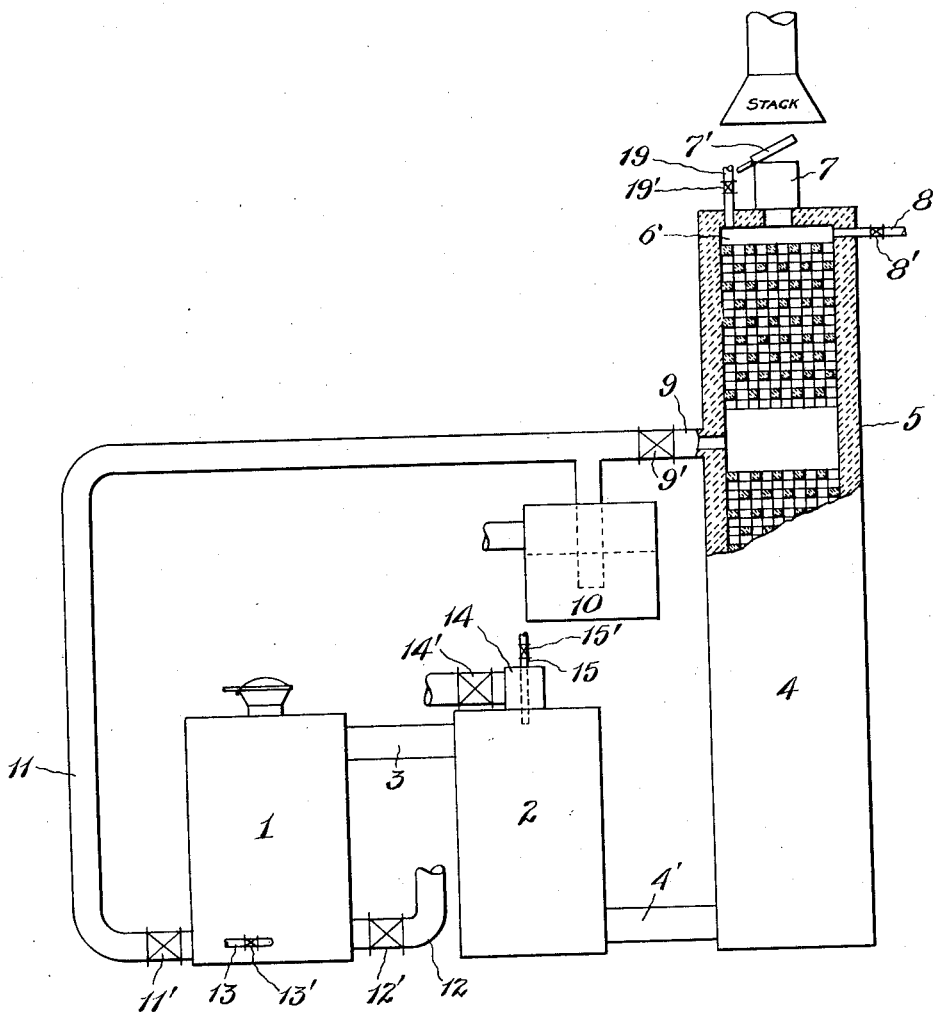
Figure 1 represents diagrammatically and partly in vertical section a carburetted water-gas set embodying that part of my invention which relates to the apparatus by means of which my improved process may be carried out.

In the embodiment illustrated by Fig. 1, a gas-generator 1 is connected at the top with a carburetor 2 by a pipe 3, and the bottom of the carburetor is connected by means of a pipe 4' with the bottom of the superheater 4 which is provided with the usual interior checker-work. The shell 5 of the superheater is extended upwardly to form a superheater extension 6 also provided with interior checker-work, and this chamber is provided at the top with a stack outlet 7 and its stack-valve 7'. The top of said chamber is connected with a water inlet 8 controlled by a valve 8' connected with a water-supply (preferably hot).

It will be noted from the above construction that the blast-gases during the air blow, pass upwardly through the superheater, then through the extension 6 and out into the stack, thus heating the checker-work therein. This extension therefore may act as an evaporator when water is admitted into it from the inlet 8.

The superheater is connected, below extension 6 and by means of its water gas outlet pipe 9 controlled by valve 9', with the seal 10.

The lower part of the gas-generator 1 is connected by pipe 11 with said seal, said pipe being controlled by a valve 11'.

The generator is provided with the air blast connection 12 and its controlling valve 12' and the up-run steam connection 13 and its controlling valve 13'.

Carburetor 2 is provided with the air blast connection 14 and its controlling valve 14', and oil connection 15 and its controlling valve 15'.

In operating the above-described apparatus, the air blow is effected in the usual manner by opening the blast valves and closing the steam and oil-valves, also closing the water-valve 8' and valves 9' and 11' and opening the stack-valve 7'.

During such air blasting the fuel in generator 1 is highly heated and the blast gases therefrom heat up the checker-work of the carburetor and superheater including the extension thereof.

After the blow, a steam up-run is made through the set by properly setting the various valves, that is, by closing valves 12', 14' and 7' and by opening valves 13', 15' and 9'. In this manner, steam is admitted through valve 13' to the highly heated fuel in gas generator 1, the water gas generated thereby is passed through pipe 3 into carburetor 2 where it is enriched by oil admitted through valve 15', the mixture of water gas and oil vapor is passed from the carburetor into superheater 4 and there superheated and fixed, and the resulting carburetted water gas passes through pipe 9, controlled by valve 9'. The water-valve 8', however, is preferably left partly open during such run so as to admit a reduced quantity of water into the superheater extension. This water is converted into steam which fills the superheater extension and forms, by its back pressure, a curtain or seal which prevents the water-gas formed during the run, from passing up into the extension and also, in case of stack-valve leakage, preventing thereby the escape of water-gas past such valve.

A down back-run is then effected by opening valve 11', closing steam-valve 13' as well as the superheater gas outlet-valve 9', further opening the water-valve 8', and closing the oil-valve 15'.

The water which enters the chamber 6 is converted into steam which flows down through the entire superheater including the extension, up through the carburetor, over into and down through the fuel bed in the generator 1 and the resulting water gas up through pipe 11 into the seal.

It will be noted that the same passages traversed by the blast-gases are also traversed by the steam, and that the latter is formed and superheated at substantially the same pressure as exists in the superheater.

After completion of the down-run, a short steam up-run is then made so as to purge the bottom of the gas-generator of any gas, after which the next blow is effected in the manner above described.

Figure 2:
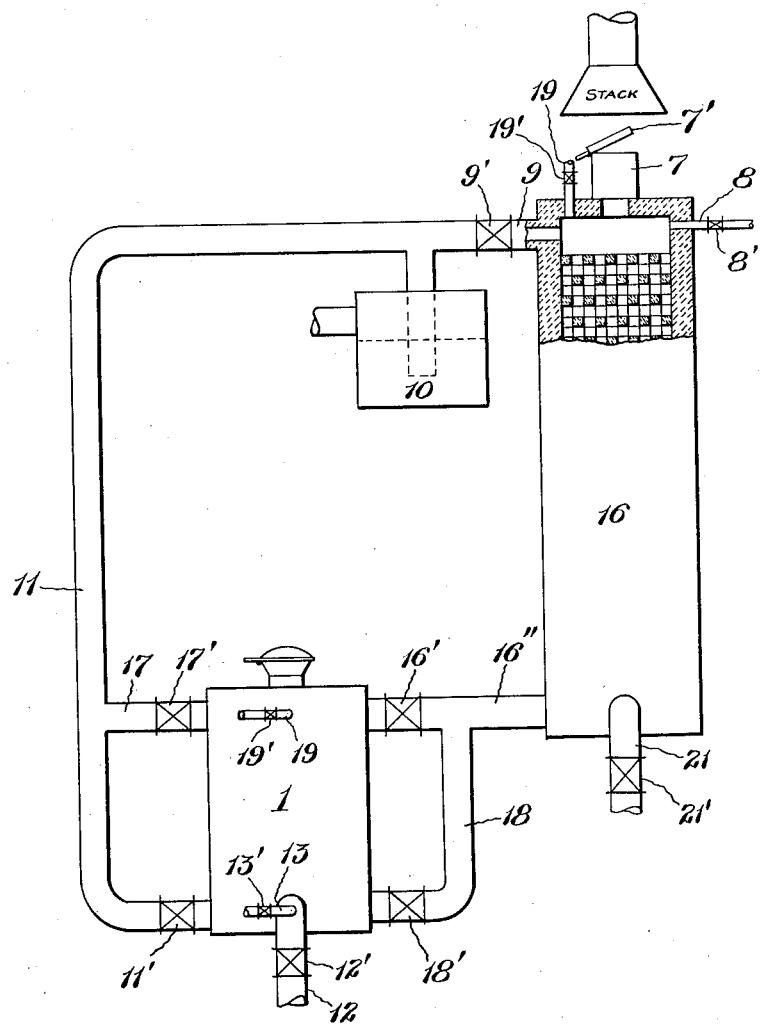
Fig. 2 represents diagrammatically and partly in vertical section, a blue water-gas set, arranged in accordance with the apparatus part of my invention.

The apparatus illustrated by Fig. 2 comprises a gas-generator 1 and a combustion chamber 16, the bottom of the latter being connected with the top of said generator by means of a pipe 16" controlled by valve 16' and provided with an air inlet pipe 21 and valve 21'. The interior of the chamber, as before, is provided with checker-work and its top with the stack outlet 7 and stack-valve 7'.

The top of the combustion chamber is provided, as before, with the water connection 8 and controlling valve 8'.

The bottom of the gas-generator is connected by pipe 11 controlled by valve 11' with the seal 10 and with the air blast connection 12 and valve 12' therefor.

The top of the gas generator is connected with pipe 11 by an outlet pipe 17 controlled by a valve 17'.

The bottom of the said generator 1 is furthermore connected with the pipe 16", by pipe 18 controlled by valve 18'.

In operating this modified form of apparatus, the air blasting is done by opening the blast-valve 12', blast-valve 21', stack-valve 7', and upper hot-valve 16'; valves 11', 17', 18' and 8' all being closed, during which blast period the checker-work in the combustion chamber 16 is heated.

To make a down back-run, the blast and stack-valves are closed and water-valve 8' upper hot-valve 16' and lower gas-valve 11' are opened.

Steam will therefore be formed in the chamber 16, flow downwardly therethrough, over into the generator 1, down through same and out of pipe 11 into the seal.

To make a back up-run the positions of the valves 16' and 18' are reversed, as are the positions of valves 11' and 17', as will be understood.

If desired, the upper portion of the combustion chamber may be connected, in the last-described structure, with the seal by means of pipe 9 controlled by valve 9'. This valve during the blast period, and during the back-runs, would be closed. Up-runs may be made through the generator, out past valve 17', through pipes 17 and 11, into the seal.

However, when this valve 9' and connection are provided, forward runs may be made through the gas-generator and then through the combustion chamber and so into the seal. In such event, the gas-generator would be provided with either an up-run steam connection 13 and valve 13' therefor, or a down-run steam connection 19 and valve 19' therefor, or both.

During such last-described forward run or runs, the water connection 8 would be shut off, and valves 11' and 17' closed and valve 9' open.

It will also be apparent that if desired, the set illustrated by Fig. 1 could be provided with the additional connections 17 and 18 and valves 16', 17' and 18', shown in Fig. 2, and a down-run steam connection so as to permit of both up and down back-runs and up and down forward-runs, as in the apparatus shown in said Fig. 2.

If it be found necessary to provide more steam than can be produced in the combustion chamber, the above-described apparatus may be amplified by the addition of a separate steam connection 19 and controlling valve 19' therefor, whereby additional steam may be supplied to the combustion chamber and the apparatus as a whole during the back-run, when the conditions so require or make it advantageous.

By these constructions, furthermore, the temperature of the combustion chamber may be controlled by the admission of either water or steam, or a varied combination of both.

The above disclosures will readily indicate to those skilled in the art, that the principles of construction and operation embodied in my invention, may in addition to being incorporated in an entirely new plant, be also applied to plants of known and already existing construction, by making the required alterations and additions thereto.

Figure 3:
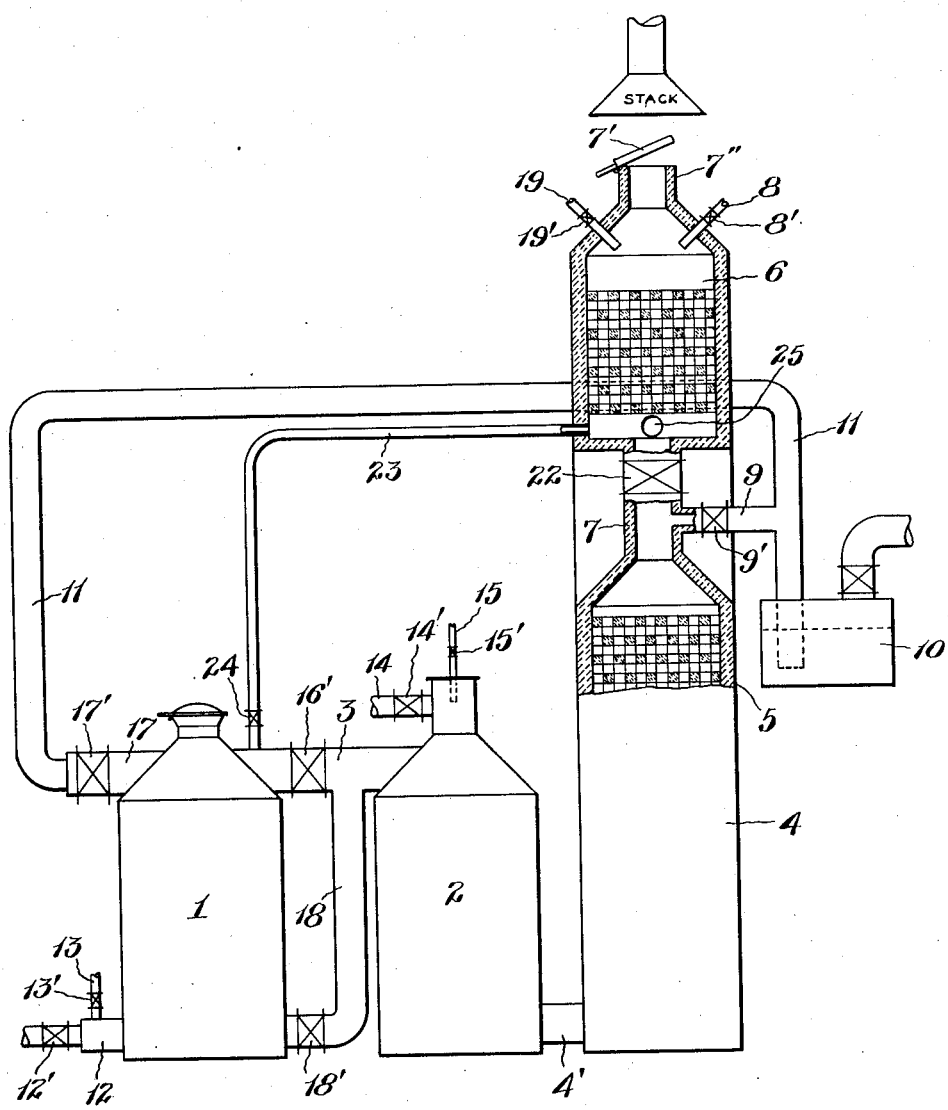
Fig. 3 represents diagrammatically and partly in vertical section a further modified form of apparatus for carrying out my invention.

The apparatus shown in Fig. 3 illustrates an existing or standard three shell water-gas set reconstructed or amplified to embody the previously described principles of my invention with an added feature which I shall presently describe.

In this construction the original superheater 4 is extended by superposing upon it the additional chamber 6 provided with the checker-work as shown, which would hence be connected with the said superheater by what was originally the stack outlet-duct 7. The top of the additional chamber is provided with a stack-outlet 7'', and stack-valve 7'.

The water gas outlet pipe 9 is connected with the structure below the chamber 6 and valve 22, and leads to the seal 10 and is controlled by the valve 9'. The top of said chamber is provided with the water inlet 8 controlled by valve 8', and if desired or required the extra steam pipe 19 and controlling valve 19' therefor.

In this particular set I have shown the generator 1 provided with the back-run gas outlet pipe 17 controlled by valve 17' and connected with the pipe 11 leading to the seal 10, as well as with the connection 18 controlled by hot-valve 18', the air blast gas outlet connection 3 controlled by hot-valve 16', the lower air blast inlet connection 12, valve 12' therefor and the lower steam inlet pipe 13 and steam valve 13'. The carbureter 2 is provided with the usual air blast connection 14 and valve 14' as well as with the oil connection 15 and valve 15'.

The apparatus as thus far described may therefore, be operated in a manner similar to that described in connection with Figs. 1 and 2, as follows;

An air blow may be effected by closing valves 8', 9', 13', 17', 18', 15' and 19', and opening valves 12', 16', 14', 22 and 7', thus heating up the additional chamber.

After the blow, a short purging forward up-run may then be made by shutting off all of the blast and other air valves, opening the steam valve 13' and valve 9' and closing valve 22.

A back or reverse up-run may then be made by opening the water valve 8', closing valve 7', valve 9', hot-valve 16', and steam-valve 13', and opening valve 22, oil-valve 15', hot-valve 18', and water gas valve 17'.

It will therefore be observed that the just-described apparatus may be used in precisely the same manner as the apparatus described in connection with Figs. 1 and 2.

The last described apparatus may be amplified by providing a heavily insulated steam pipe 23 leading from the chamber 6 to the top of the generator and provided with a controlling valve 24, whereby forward down-runs may be made utilizing the steam from said pipe 23 which will have been formed and superheated in said chamber 6, and thus utilizing the heat conserved by said chamber, in addition to using it in a back-run as previously described, or the back-run may be omitted if desired and the heat from the chamber used to effect an increase of efficiency in the plant.

As in the case of the apparatus shown in Figs. 1 and 2, the extra steam connection 19 and valve 19' may be supplied for use when required.

A further addition to the apparatus of Fig. 3 may be made in an air supply inlet 25 at the bottom of the chamber 6, controlled by a suitable valve (not shown).

When it is found that by admitting sufficient air through the pipe 14 for completely burning the air gases made during the blast period, the carburetor would be too highly heated, such air may be reduced and combustion of the unburned gases effected in the chamber 6 by admitting air from the inlet 25, thus compensating for the incomplete combustion in the carburetor which is necessitated under the above condition, and applying the heat of the resultant additional or tertiary combustion, to the checker-work in chamber 6 to be applied to the production of steam for use as previously described.

It will be noted from the aforegoing description that the heat of the air blast gases is economically utilized for producing the steam required for the back-runs at substantially the superheater pressure, in the case of a carburetted water gas set, and at substantially the pressure of the combustion chamber, in the case of blue water gas apparatus; and that the steam thus produced and used, can be previously used as a gas seal during a water gas-making run.

What I claim is:

1. A process of making carbureted water gas in a set comprising a single generator having a solid bed of fuel, a single carburetor having checkerbrick therein, and a single superheater having checkerbrick therein; which process comprises air blasting the fuel bed, burning the blast gases and heating the checkerbrick in the carburetor and superheater, then passing steam through the highly heated fuel bed in the generator and generating water gas, passing the water gas through the carburetor and enriching the water gas by adding oil thereto, passing the enriched water gas to the lower portion of the superheater and fixing the oil vapors mixed with the water gas, withdrawing the carbureted water gas from an intermediate portion of the superheater, then admitting water to the heated checkerbrick in the upper portion of the superheater above the intermediate gas offtake, passing the steam generated in the upper portion of the superheater downwardly therethrough, through the carburetor and through the heated fuel bed in the generator, and withdrawing the resulting water gas directly from the generator.

2. The process specified in claim 1, with the additional step of purging the set, after withdrawing the water gas directly from the generator, by passing steam through the heated fuel bed in the generator and then through the carburetor and into the lower portion of the superheater, and withdrawing the resulting gas from the intermediate portion of the superheater.

3. A process of making carbureted water gas in a set comprising a single generator having a solid fuel bed, a single carburetor having checkerbrick therein, and a single superheater having checkerbrick therein; which process comprises air blasting the fuel bed, burning the blast gases and heating the checkerbrick in the carburetor and superheater, then passing steam through the highly heated fuel bed in the generator and generating water gas, passing the water gas through the carburetor and enriching the water gas by adding oil thereto, passing the enriched water gas to the lower portion of the superheater and fixing the oil vapors mixed with the water gas, admitting a limited amount of water to the heated checkerbrick in the upper portion of the superheater and generating steam thereby, withdrawing the carbureted water gas from an intermediate portion of the superheater below the water inlet, then admitting an increased amount of water to the heated checkerbrick in the upper portion of the superheater above the intermediate gas offtake, passing the steam generated in the upper portion of the superheater downwardly therethrough, through the carburetor and through the heated fuel bed in the generator, and withdrawing the resulting water gas directly from the generator.

4. A process of making carbureted water gas in a set comprising a single generator having a solid fuel bed, a single carburetor having checkerbrick therein, and a single superheater having checkerbrick therein; which process comprises air blasting the fuel bed, burning the blast gases and heating the checkerbrick in the carburetor and superheater, then passing steam through the highly heated fuel bed in the generator and generating water gas, passing the water gas through the carburetor and enriching the water gas by adding oil thereto, passing the enriched water gas to the lower portion of the superheater and fixing the oil vapors mixed with the water gas, withdrawing the carbureted water gas from an intermediate portion of the superheater, then passing steam from the heated checkerbrick in the upper portion of the superheater above the intermediate gas offtake downwardly through the superheater, through the carburetor and through the heated fuel bed in the generator, and withdrawing the resulting water gas directly from the generator.

5. A process of making carbureted water gas in a set comprising a single generator having a solid fuel bed, a single carburetor having checkerbrick therein, and a single superheater having checkerbrick therein; which process comprises air blasting the fuel bed, burning the blast gases and heating the checkerbrick in the carburetor and superheater, then generating steam by admitting water to the heated checkerbrick in the upper portion of the superheater, passing steam from the upper portion of the superheated through the highly heated fuel bed in the generator and generating water gas, passing the water gas through the carburetor and enriching the gas by adding oil thereto, passing the water gas by adding oil thereto, passing the enriched water gas to the lower portion of the superheater and fixing the oil vapors mixed with the water gas, withdrawing the carbureted water gas from an intermediate portion of the superheater, then passing steam generated by the heated checkerbrick in the upper portion of the superheater above the intermediate gas offtake downwardly through the superheater, through the carburetor and through the heated fuel bed in the generator, and withdrawing the resulting water gas directly from the generator.

Signed by me this tenth day of April, 1925.

WALTER M. RUSSELL.